United States Patent [19]

Scott

[11] 4,200,330
[45] Apr. 29, 1980

[54] LOAD RETAINING DEVICE FOR SILAGE TRUCK

[76] Inventor: H. Edwin Scott, Rte. 2, Mebane, N.C. 27302

[21] Appl. No.: 909,387

[22] Filed: May 25, 1978

[51] Int. Cl.² .............................................. B60P 7/04
[52] U.S. Cl. ............................... 296/100; 296/137 B; 49/340
[58] Field of Search .......................... 296/100, 137 B; 105/377; 49/340; 220/334

[56] References Cited

U.S. PATENT DOCUMENTS

| | | | |
|---|---|---|---|
| 2,043,858 | 6/1936 | Moore | 296/100 |
| 2,757,041 | 7/1956 | Alcorn | 296/100 |
| 3,168,345 | 2/1965 | Roberts et al. | 296/100 |
| 3,338,623 | 8/1967 | Morrison | 296/100 |
| 3,485,524 | 12/1969 | Nelson | 296/100 |
| 3,628,685 | 12/1971 | Gordon | 220/334 |
| 3,913,696 | 10/1975 | Hoch | 296/100 |
| 3,923,334 | 12/1975 | Key | 296/100 |
| 4,067,603 | 1/1978 | Fenton | 296/100 |

*Primary Examiner*—Robert R. Song

[57] ABSTRACT

A load retaining cover is attachable to existing opened top silage trucks. The cover includes a lightweight supporting frame having a hinged cover formed of a frame covered by fine gauge wire mesh attached thereto. The cover is mounted to the support frame along a hinge axis extending parallel to a side wall of the truck cargo bed whereby access is from the side. The hinged cover section includes means connected to and operated by the truck electrical system for raising and lowering that section to open the cargo bed for deposit of silage therein.

5 Claims, 2 Drawing Figures

LOAD RETAINING DEVICE FOR SILAGE TRUCK

BACKGROUND OF THE INVENTION

Various types of body closures are known in the prior art which are utilized to maintain cargo within the otherwise opened top load bed of a truck or other vehicle. The prior art reveals numerous cover means for trash, pickup, and dump trucks and other vehicles; such covers being manually and/or power operated.

Most of these devices were developed to prevent the expensive loss of lightweight cargo such as dirt, trash, gravel, silage and the like from the truck during transport. A large number of the covers, including U.S. Pat. Nos. 4,067,603 and 3,168,345, are collapsible covers which are folded toward the vehicle cab when it is desired to partially open the load bed. These collapsible covers often are subject to malfunction because of the numerous related parts which are subject to failure.

U.S. Pat. No. 3,913,969 to N. Hoch is directed to a single, rigid, extremely heavy top member hinged near the upper front edge of the load bed body, which top is raised and lowered by means of hydraulic cylinders. The Hoch apparatus most nearly approaches the present invention in its most basic concept. However, the Hoch invention is directed to a permanently mounted cargo cover installed by the manufacturer and having a relatively expensive hydraulic lifting means necessitated by the heavy weight of the cover.

None of the devices known to applicant are easily adaptable to existing silage trucks and operable by the driver in the cab from the vehicle electrical system.

SUMMARY OF THE PRESENT INVENTION

Vehicles utilized by silage producers for transporting the harvested material to processing and storage facilities have come under regulations requiring that the cargo be covered to prevent scattering of debris. Additionally, producers have long desired an efficient, lightweight means for covering the silage material to prevent loss during transport.

The cargo cover according to the present application is directed to a cover apparatus which may be easily attached to and removed from existing vehicles, generally by the owners without need for special expertise; which cover is lightweight and may be opened and closed by the driver utilizing energy obtained from the vehicle electrical system.

Broadly, the cover apparatus includes a relatively lightweight support frame attachable to the upper edges of the surrounding walls of the vehicle load bed. A sheet or skin of metal screening or other lightweight, flexible material is mounted over the frame to enclose the sides and a portion of the top. A relatively large portion of the frame is hinged along one side wall of the load bed, or along a second portion of the frame parallel to a side wall of the load bed and is selectively openable for depositing silage therein. It is unique and an important element of the invention that the hinged side of the cover extend along a line parallel to a side wall so that the cover is raised toward one side of the truck. This feature is important because most harvesting equipment includes large hydraulically controlled bins which gather the silage and when full are lifted to tip and dump the silage loads into a truck for transportation to processing and storage facilities. These bins are substantially wider than the average vehicle load bed. It is therefore necessary that the harvester move along side the vehicle whereby the length of the load bed more closely matches the width of the harvester bin. The silage may be dumped into the bed without significant loss of the gathered material. If attempts are made to empty the harvester bins across the width of the cargo bed, much silage will be spilled on the ground.

The hinged portion or cover of the load retaining assembly or cover is opened and closed by a 12-volt electrical linear actuator powered by the vehicle electrical system. The linear actuator includes a motor connected to a gear box which includes an activating shaft coupled to a connecting bar which is in turn secured to the hinged portion of the cover. When the actuator is energized the connecting bar is moved to raise or lower the hinged portion.

In operation, after the load retaining assembly has been installed on an existing vehicle cargo bed, the vehicle driver selectively raises the hinged cover as the vehicle moves alongside the harvester. After the harvester bin is emptied into the load bed, the hinged cover is lowered to enclose the load bed and retain the silage when the vehicle is moving.

Therefore, the objects of the present invention include:

1. the provision of a load retaining assembly for easy attachment to the walled load bed of existing vehicles;

2. the provision of such a load retaining assembly including a hinged cover operated by power from the vehicle electrical system; and 3. the provision of a load retaining assembly for silage hauling vehicles, which assembly is operatively compatible with wide-bin harvesting equipment.

While the description here is directed to a load retaining cover for silage trucks, it should be understood that such description is only exemplary and the invention is not limited to such use. Other objects and advantages will become apparent to those skilled in the art when the following detailed description is studied in conjunction with the accompanying drawings, of which:

DETAILED DESCRIPTION OF PREFERRED EMBODIMENT

Figure 1:
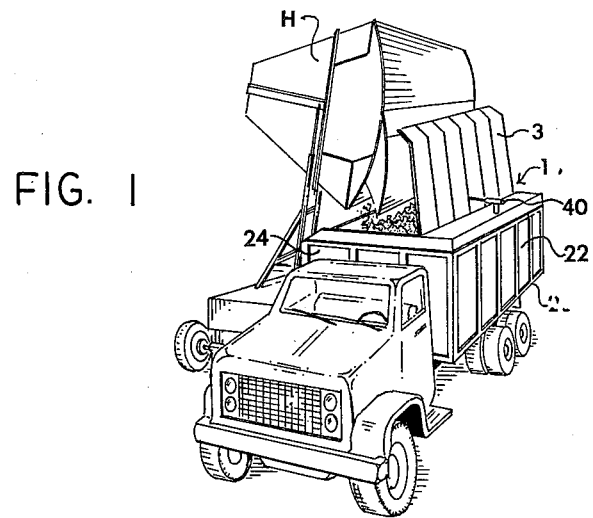
FIG. 1 is an environmental perspective of a preferred embodiment.

FIG. 1 illustrates a preferred embodiment of the load retaining assembly 10 emplaced on the cargo bed 20 of an existing vehicle V. The vehicle includes a cargo or load bed 20 having opposing side walls 22, a front wall 24, and a rear wall which is not shown. Silage or other harvested material is deposited into the cargo bed 20 from a harvester bin H while a hinged cover 30 of the load retaining assembly 10 is in its rasied or open position.

Figure 2:
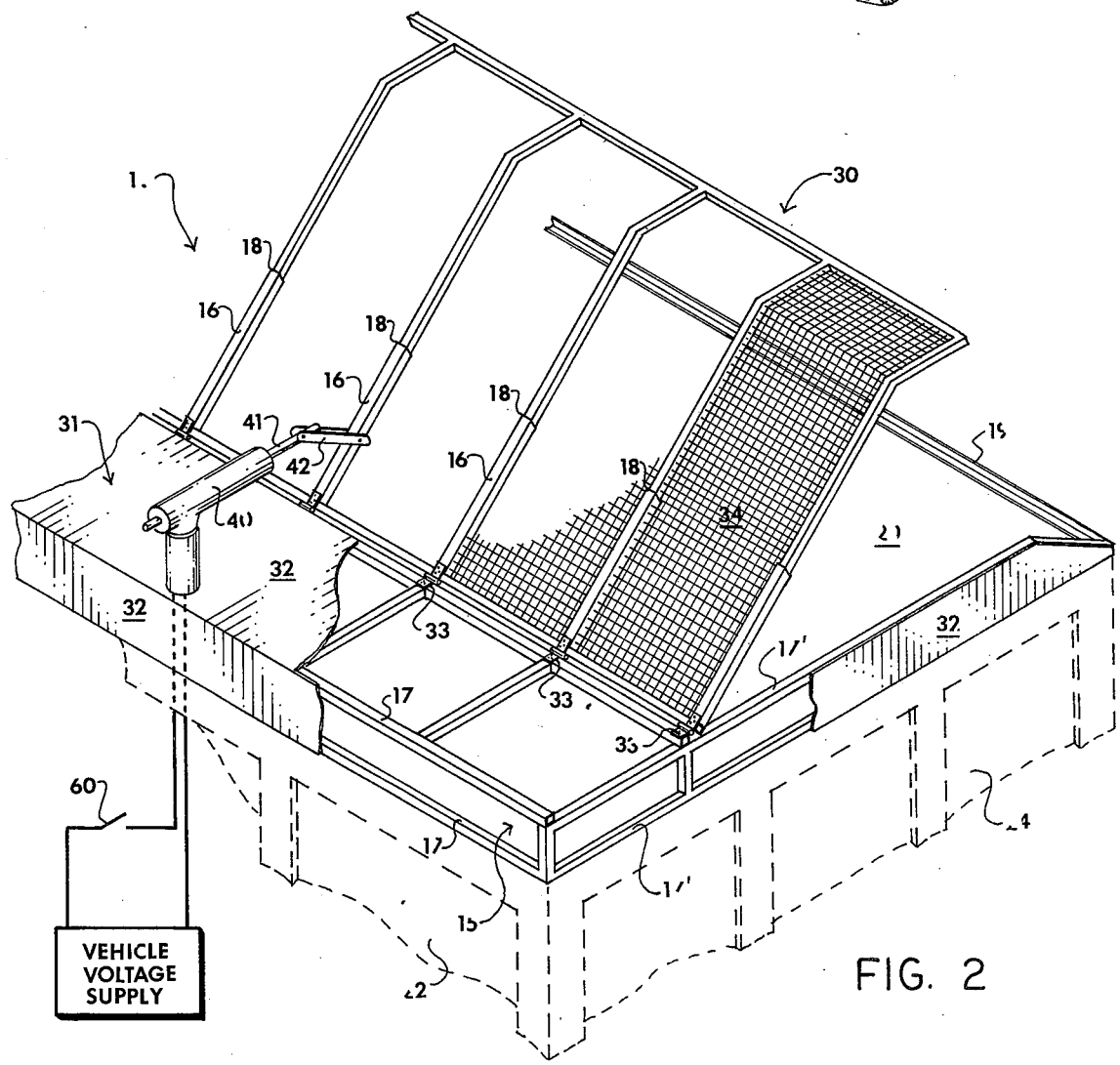
FIG. 2 is a perspective view, with parts broken away, illustrating the load retaining assembly according to a preferred embodiment.

FIG. 2 is a detailed view of a load retaining assembly 10 including a fixed supporting frame 15 mounted by conventional means such as bolts to the upper surfaces of the existing walled load bed 20 and includes upper and lower side support rails 17, upper and lower front and rear rails 17', a closure facing 19 along the side opposite rails 17 (which facing may be omitted if desired), and a platform area or deck 31 along one side. A hinged cover 30 is pivotally connected to deck 31 by a plurality of hinges 33 and may be selectively raised or lowered to open or close the access opening to cargo bed 20.

The supporting frame 15 is preferably constructed from a lightweight material such as aluminum or magnesium tubing welded together. Other framing materials such as wood, fiberglass or known metals might be utilized so long as the material is sufficiently rigid to support the structure and light in weight so that cover 30 may be easily activated and lifted by a relatively small linear actuator energized by the vehicle electrical system.

Overlying the platform area 31 and the surrounding support rails 18 is a skin 32 formed of sheet metal or other lightweight sheet material which will enclose the stationary or fixed portion of the assembly to prevent loss of silage therethrough. With respect to platform or deck 31 the sheet material 32 chosen should be strong enough to serve as a platform floor which supports the linear actuator 40 thereon.

An expanse of wire mesh 34 overlies the second, hinged cover segment 30. Wire mesh is the preferred sheeting material used to overlay the cover 30 because of its wieght and durability. Although other lightweight sheeting such as polyethylene or foil could be utilized as an overlay for the hinged cover, they are less durable and more likely to tear or puncture than the wire mesh.

A linear actuator 40 is secured to deck 31 and has the output shaft thereof coupled to cover 30 for operation thereof. Linear actuator 40 may take various forms, however, in a preferred embodiment it is contemplated that a Warner Electric Linear Actuator, manufactured by Warner Electric Brake & Clutch Company of Beloit, Wisconsin, will be satisfactory. This linear actuator includes a motor connected to and operated by the vehicle electrical system, a ball bearing screw which converts rotary motion to linear motion, and a worm gear which converts torque from the electric motor to the ball bearing screw. The output shaft 41 of the linear actuator is attached to an operating bar 42, which in turn is pivotally attached to one of the cross members 16 of the cover 30.

The load retaining assembly 10 may be installed by the owner/operator of an existing vehicle having a walled cargo bed thereon. The assembly 10 is generally rectangular in shape and of a length compatible with standardized cargo beds as produced by major vehicle manufacturers. Because some variation may exist in the width dimension of cargo beds, telescoping means 18 is provided on front and rear support rails 17' and on cover cross bars 16 so that the width of the entire supporting frame 15 may be adjusted to fit the width of the cargo bed 20. The telescoping means 18 is conventional in design and a description is not deemed necessary except that the cover cross bars 16 are adjusted for width by telescoping inwardly or outwardly prior to affixing the wire mesh overlay.

After the supporting frame has been secured to the upper surfaces of the walls of the cargo bed by any of several known methods such as bolting or the like, the sheet metal overlay 32 is emplaced around the support rails 17,17' and over the platform section 31. The cover 30 with the wire mesh overlay emplaced is then attached to the platform section by means of a plurality of hinges 33 located on either end of the cover 30 and inwardly toward the center as necessary to proper support of the cover.

It should here be noted that the axis of revolution about which cover 30 rotates extends parallel to a side wall 22 of the cargo bed so that when the cover 30 is raised it pivots toward one side of the vehicle allowing access from the opposite side. FIG. 1 illustrates the harvester bin H in position over the lengthwise expanse of the open cargo bed.

After the hinged cover 30 is mounted to support frame 15 the linear actuator 40 is bolted or otherwise attached to the platform section 31. The output shaft 41 of the actuator 40 is coupled to a operating bar 42 which in turn is secured to the cover 30. The motor of the linear actuator 40 is electrically connected to and energized by the vehicle electrical system.

During harvesting the vehicle V is maneuvered alongside the harvester H, the operator closes a switch 60 located in the cab area of the vehicle, which switch activates the linear actuator. The connecting linkage between the actuator 40 and cover 30 lift the cover 30 and open the cargo bed to receive silage therein. When the deposit is complete, the switch is activated again to lower the cover 30 so that silage is not lost by wind, etc. during movement of the vehicle.

When the cargo bed has been filled with silage which is to be transported for storage, if desired, the cover 30 may be locked, latched, or it may merely be left in a closed position.

It is obvious that the present invention is susceptible to alternate embodiments without departing from the scope of the invention as claimed below.

What is claimed is:

1. A load retaining device for attachment to the cargo bed of a wheeled vehicle, which cargo bed includes spaced side walls, a front wall, a rear wall, and an open top, said load retaining device comprising:
    (a) a supporting frame of substantially the same dimensions as the open top of the cargo bed and including means for securely mounting said supporting frame over said open top;
    (b) said supporting frame further including a platform segment substantially the same length as the side walls of the cargo bed and of such a width as to cover a minor portion of the open top of the cargo bed, said platform having an inner side edge extending lengthwise parallel to and adjacent one of said side walls when said frame is secured to said cargo bed;
    (c) a cover segment of such dimensions as to cover a major portion of the open top of the cargo bed, said cover having opposed side edges substantially equal to the length of said platform, and a width dimension substantially greater than the width of said platform, said cover segment being pivotally mounted around one side edge to said platform;
    (d) said supporting frame and said cover being covered by a lightweight sheel material whereby the contents of said cargo bed are enclosed when the cover is closed;
    (e) power means mounted on said load retaining device and activated from within said vehicle for raising and lowering said cover segment about an axis of rotation extending parallel to the side walls of said cargo bed to selectively open and close the cargo bed.

2. A load retaining assembly as described in claim 1 wherein said means for raising and lowering said cover segment includes a linear actuator mounted on said platform and operatively connected to said cover segment; said linear actuator being connected to and energized by the vehicle electrical system.

3. A load retaining assembly as described in claim 1 further including means for adjusting the width dimension of said supporting frame and cover segment.

4. A load retaining device for attachment to the cargo bed of a wheeled vehicle, which cargo bed includes spaced side walls, a front wall, a rear wall, and an open top, said load retaining device comprising:
 (a) a supporting frame of substantially the same dimensions as the open top of the cargo bed and including means for securely mounting said supporting frame over said open top;
 (b) said supporting frame further including a plurality of side support rails and a platform segment substantially the same length as the side walls of the cargo bed and of such a width as to cover a minor portion of the open top of the cargo bed, said platform having an inner side edge extending lengthwise parallel to and adjacent one of said side walls when said frame is secured to said cargo bed;
 (c) a cover segment of such dimensions as to cover a major portion of the open top of the cargo bed, said cover having opposed side edges substantially equal to the length of said platform, and a width dimension substantially greater than the width of said platform, and a plurality of crossbars extending between said opposing side edges;
 (d) said cover segment being pivotally mounted around one side edge to said platform;
 (e) said supporting frame and said cover being covered by a lightweight sheet material whereby the contents of said cargo bed are enclosed when the cover is closed;
 (f) power means mounted on said load retaining device and activated from within said vehicle for raising and lowering said cover segment about an axis of rotation extending parallel to the side walls of said cargo bed to selectively open and close the cargo bed;
 (g) means for adjusting the width dimension of said supporting frame and cover segment.

5. A load retaining assembly as described in claim 4 wherein said width adjusting means includes telescoping means on said cover crossbars and said side support rails.

* * * * *